United States Patent
Kim

(10) Patent No.: US 9,951,722 B2
(45) Date of Patent: Apr. 24, 2018

(54) CHAMBER FOR REDUCING OPERATING NOISE OF PURGE CONTROL SOLENOID VALVE FOR EVAPORATIVE EMISSION CONTROL SYSTEM

(71) Applicants: HYUNDAI MOTOR COMPANY, Seoul (KR); KIA MOTORS CORPORATION, Seoul (KR)

(72) Inventor: YoungMin Kim, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 315 days.

(21) Appl. No.: 14/838,362

(22) Filed: Aug. 27, 2015

(65) Prior Publication Data

US 2016/0061156 A1 Mar. 3, 2016

(30) Foreign Application Priority Data

Aug. 27, 2014 (KR) ........................ 10-2014-0112629

(51) Int. Cl.
*F02M 25/08* (2006.01)
*F16K 47/04* (2006.01)
*F16K 47/12* (2006.01)

(52) U.S. Cl.
CPC ...... *F02M 25/0836* (2013.01); *F02M 25/089* (2013.01); *F16K 47/04* (2013.01); *F16K 47/12* (2013.01); *F02M 2025/0845* (2013.01)

(58) Field of Classification Search
CPC .......... F02M 25/0836; F02M 25/0872; F02M 25/089; F02M 2025/0845; F16K 47/04; F16K 47/08
See application file for complete search history.

(56) References Cited

U.S. PATENT DOCUMENTS

| 4,679,597 A | 7/1987 | Stein |
| 5,538,219 A * | 7/1996 | Osterbrink ......... F02M 25/0836 251/129.05 |

(Continued)

FOREIGN PATENT DOCUMENTS

| DE | 102014001628 A1 * | 8/2015 | ............ F16K 47/08 |
| JP | H09257184 A | 9/1997 | |

(Continued)

*Primary Examiner* — Erick Solis
*Assistant Examiner* — Anthony L Bacon
(74) *Attorney, Agent, or Firm* — McDermott Will & Emery LLP

(57) ABSTRACT

A chamber for reducing operating noise of a purge control solenoid valve (PCSV) for an evaporative emission control system comprises a first housing into which operating noise of the PCSV enters. The first housing has an inner space to change a cross sectional area of an operating noise path or an operating noise transfer direction at least once. A second housing has an upper portion coupled to a lower portion of the first housing to transfer the operating noise outside. At least one end of the chamber in a length direction thereof is connected with a vapor hose which connects a canister collecting fuel evaporation gas generated from a fuel tank with the PCSV to deliver the fuel evaporation gas to an engine and through which the fuel evaporation gas flows.

5 Claims, 4 Drawing Sheets

(56) References Cited

U.S. PATENT DOCUMENTS

| | | | | |
|---|---|---|---|---|
| 2005/0269539 A1* | 12/2005 | Schulz | ............... | F02M 25/0836 |
| | | | | 251/129.22 |
| 2012/0318242 A1* | 12/2012 | Roh | ...................... | F16K 27/029 |
| | | | | 123/520 |
| 2013/0247880 A1* | 9/2013 | Plymale | ............. | F02M 25/0836 |
| | | | | 123/519 |
| 2014/0076286 A1* | 3/2014 | Karim | ................... | F02M 25/08 |
| | | | | 123/520 |

FOREIGN PATENT DOCUMENTS

| | | | |
|---|---|---|---|
| JP | H09296897 A | 11/1997 | |
| KR | 10-0813999 B | 3/2008 | |
| KR | 100813999 B1 | 3/2008 | |
| KR | 1020080025997 A | 3/2008 | |
| KR | 101251272 B1 | 4/2013 | |
| KR | 101255943 B1 | 4/2013 | |
| WO | WO 2012176238 A1 * | 12/2012 | ............. F16K 47/08 |

* cited by examiner

CHAMBER FOR REDUCING OPERATING NOISE OF PURGE CONTROL SOLENOID VALVE FOR EVAPORATIVE EMISSION CONTROL SYSTEM

CROSS-REFERENCE TO RELATED APPLICATION

The present application claims the benefit of priority to Korean Patent Application Number 10-2014-0112629 filed in the Korean Intellectual Property Office on Aug. 27, 2014, the entire content of which application is incorporated herein for all purposes by this reference.

TECHNICAL FIELD

The present disclosure relates to a chamber for reducing operating noise of a purge control solenoid valve (PCSV), and more particularly, to a chamber mounted at a noise transfer path of an evaporative emission control system for a vehicle in order to reduce operating noise of a PCSV during engine idling or driving at low speed.

BACKGROUND

A vehicle has an emission control system in which a purge control solenoid valve (PCSV) is installed between an intake manifold and a canister to control fuel evaporation gas collected at the canister.

The canister collects the fuel evaporation gas to flow into a surge tank through the PCSV that is controlled by an engine control unit (ECU) which receives information from sensors, such as a coolant temperature sensor, an oxygen sensor, etc.

Then, the fuel evaporation gas, which is detrimental, is combusted and prevented from being discharged into the atmosphere.

The PCSV can be classified into a duty control type PCSV which is controlled by the ECU and an on/off control type PCSV which is controlled by negative pressure of an intake manifold and the ECU, and the PCSV is generally closed under low coolant temperature or engine idling.

When an engine operates in a normal temperature range, the PCSV is opened and the fuel evaporation gas collected at the canister flows through a vapor hose into the intake manifold to be combusted.

Whenever the PCSV is opened and closed by an actuator, operating noise is generated and transferred in the reverse direction to an inflow direction of the fuel evaporation gas through the vapor hose which connects the PCSV and the canister.

Further, pulsation noise is generated due to pulsating of the fuel evaporation gas passing through the PCSV and transferred through the vapor hose in the reverse direction to a pulsating direction.

In general, the operating noise of the PCSV and the pulsation noise transfer to a driver's seat through the vapor hose because the vapor hose connects the canister and the PCSV and transfers the noise to a dash panel disposed in front of the driver's seat.

Thus, during engine idling and driving at a low speed, noises are generated.

The above information disclosed in this Background section is only for enhancement of understanding of the background of the invention, and therefore, it may contain information that does not form the prior art that is already known in this country to a person of ordinary skill in the art.

SUMMARY

Various aspects of the present inventive concept provide a chamber fitted at a vapor hose which connects a canister and a PCSV in order to improve vehicle noise.

According to an exemplary embodiment of the present inventive concept, a chamber for reducing operating noise of a purge control solenoid valve (PCSV) for an evaporative emission control system comprises a first housing into which the operating noise of the PCSV enters. The first housing has an inner space to change a cross sectional area of an operating noise transfer path or an operating noise transfer direction at least once. A second housing has an upper portion coupled to a lower portion of the first housing to transfer the operating noise outside. At least one end of the chamber in a length direction thereof is connected with a vapor hose which connects a canister collecting fuel evaporation gas generated from a fuel tank with the PCSV to deliver the fuel evaporation gas to an engine and through which the fuel evaporation gas flows.

The operating noise transfer direction may be reverse to a flow direction of the fuel evaporation gas.

The first housing may comprise a column extending from an upper portion of a center of the first housing in a lower direction. A fixing hole is formed from a lower end of the column in an upper direction. At least one inlet hole is formed at an upper end of the column and communicates with the fixing hole such that the operating noise enters therethrough into the fixing hole, and the column may have a first outlet hole formed thereat.

The first outlet hole may be formed in a width direction of the first housing.

A spirally shaped passage may be formed around the column in the first housing such that the operating noise transferred to the outside from the first outlet hole is transferred to an upper portion of the second housing.

The second housing may comprise an insert portion inserted into the fixing hole to couple the second housing to the first housing. An outlet hole portion is formed in a height direction of the second housing and has at least one second outlet hole.

The chamber may further comprise a first pipe and a second pipe. An upper end portion of the first housing may be fitted at or integrally formed with an end of the first pipe such that the at least one inlet hole communicates with the first pipe. A lower end portion of the second housing may be fitted at or integrally formed with an end of the second pipe such that the at least one second outlet hole communicates with the second pipe.

DETAILED DESCRIPTION

Reference will now be made in detail to various embodiments of the present inventive concept(s), examples of which are illustrated in the accompanying drawings and described below. While the inventive concept(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 1:
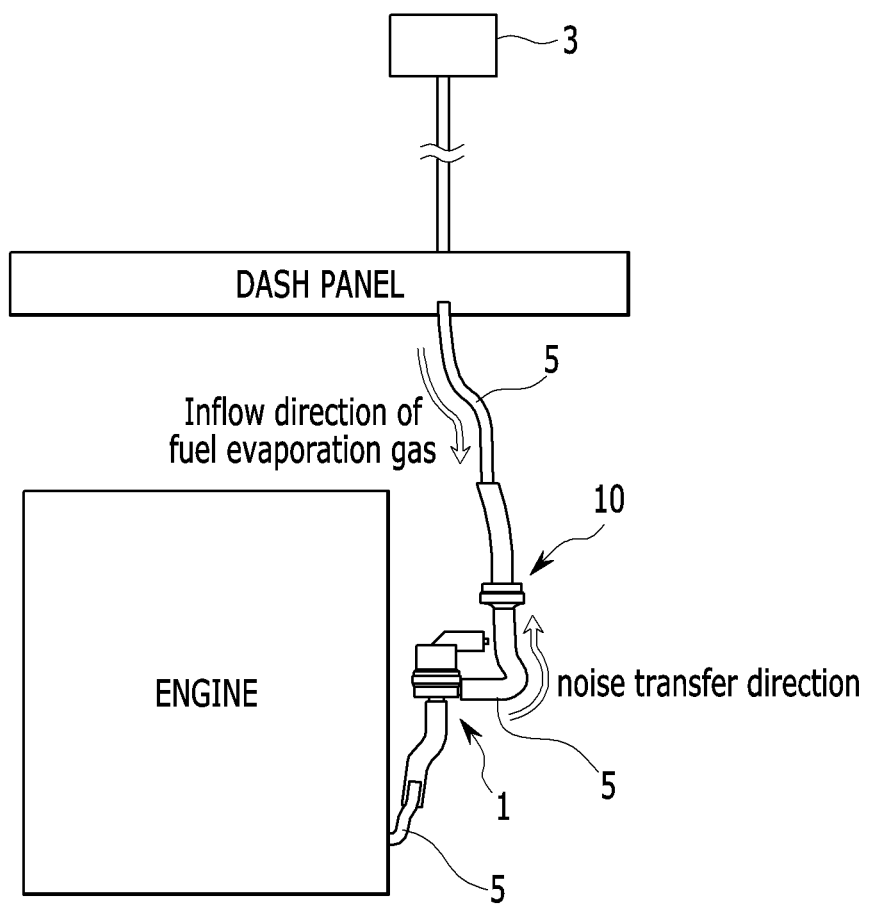
FIG. 1 is a schematic diagram of a front portion of an emission control system of a vehicle having a chamber reducing operating noise of a purge control solenoid valve (PCSV) according to the present disclosure.

FIG. 1 is a schematic diagram of a front portion of an evaporative emission control system of a vehicle having a chamber for reducing operating noise of a purge control solenoid valve (PCSV) according to the present disclosure.

Referring to FIG. 1, an evaporative emission control system has a chamber 10 for reducing operating noise of a PCSV installed between a canister 3 which is connected to a rear end of a vapor hose 5 in a length direction of a vehicle and a PCSV 1 which is connected to a front end of the vapor hose 5 in the length direction of the vehicle.

At least one end of the chamber 10 in a length direction thereof may be connected with the vapor hose 5. That is, an end of the chamber 10 may be connected with an end of the PCSV 1, and both ends of the chamber 10 may be connected with the vapor hose 5.

Therefore, it can be understood that fuel evaporation gas collected at the canister is supplied into an engine and is combusted, as passing through the vapor hose 5, the chamber 10, and the PCSV 1 sequentially by operation of the PCSV 1.

On the contrary, pulsation noise generating when the fuel evaporation gas passes through the PCSV 1 and operating noise of the PCSV 1 are transferred towards a dash panel, as passing through the PCSV 1, the vapor hose 5, the chamber 10, and the vapor hose 5 sequentially.

Figure 2:
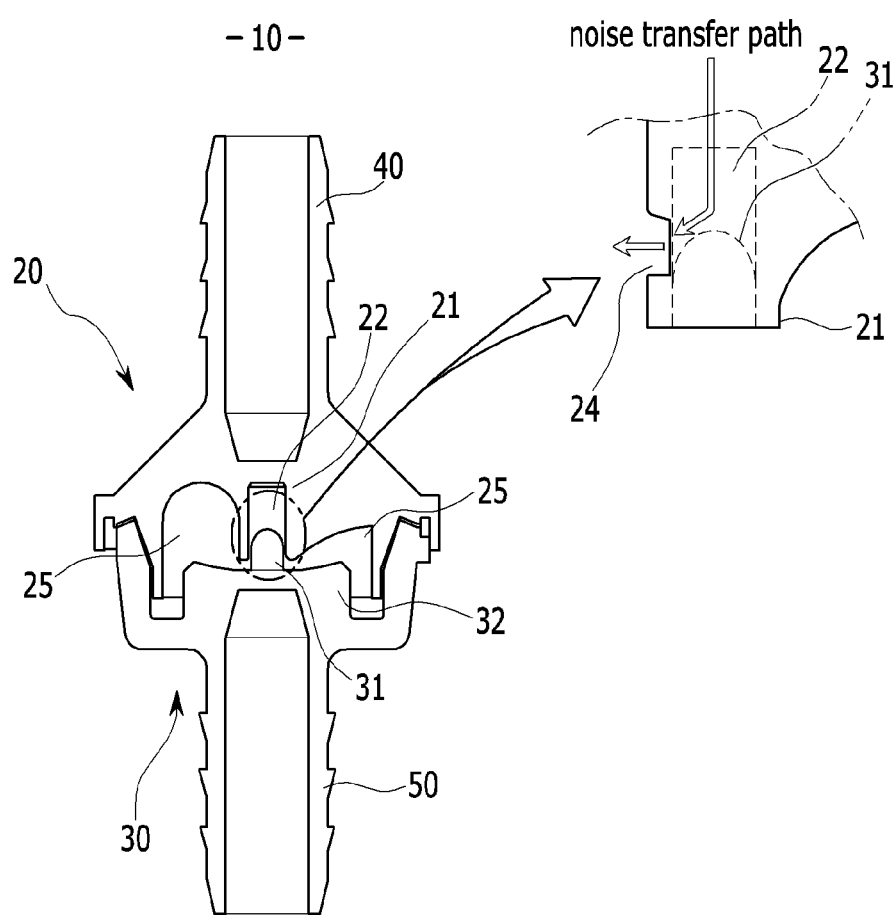
FIG. 2 is a cross-sectional view of a chamber and a side view of a center portion of the chamber in a length direction according to the present disclosure, which illustrates a noise transfer path.

FIG. 2 is a cross-sectional view of a chamber and a side view of a center portion of the chamber in a length direction according to the present disclosure, which illustrates an operating noise transfer path.

Referring to FIG. 2, the chamber 10 may comprise a first housing 20 and a second housing 30.

The chamber 10 may further comprise a first pipe 40 and a second pipe 50.

Operating noise of the PCSV 1 enters into the first housing 20 which may have an inner space to change a cross-sectional area of a transfer path of the operating noise or a transfer direction of the operating noise at least once.

The second housing 30 may allow the operating noise to be transferred to the outside in a predetermined direction by coupling an upper portion thereof to a lower portion of the first housing 20.

The first housing 20 may comprise a column 21 extending from an upper portion of a center of the first housing 20 in a lower direction. A fixing hole 22 is formed from a lower end of the column 21 in an upper direction. At least one inlet hole 23 (refer to FIG. 3) is formed at an upper end of the column 21 and communicates with the fixing hole 22 such that the operating noise enters therethrough into the fixing hole 22.

The column 21 may have a first outlet hole 24 formed thereat to change a transfer direction of the operating noise.

In this case, the first outlet hole 24 may be formed in a width direction of the first housing 20 as shown in FIG. 2.

Referring to FIG. 2 (right figure), operating noise entering into the fixing hole 22 through the at least one inlet hole 23 (refer to FIG. 3) is blocked by an insert portion 31 which is inserted into the fixing hole 22 and fixed thereat. Here, the transfer path is changed, and the operating noise passes out through the first outlet hole 24.

Referring to FIG. 2, the second housing 30 may comprise an insert portion 31 inserted into the fixing hole 22 such that the second housing 30 is coupled to the first housing 20. An outlet hole portion 32 is formed in a height direction of the second housing 30 and has at least one second outlet hole 33 (refer to FIG. 4).

Referring to the right side drawing in FIG. 2, the operating noise entering into the fixing hole 22 through the at least one inlet hole 23 (refer to FIG. 3) is blocked by the insert portion 31 which is inserted into the fixing hole 22 and fixed thereat. Here, the transfer path is changed, and the operating noise passes out through the first outlet hole 24.

In the first housing 20, a spirally shaped passage 25 may be formed around the column 21, such that the noise transferred to the outside from the first outlet hole 24 is transferred to an upper portion of the second housing 30.

Referring to FIG. 2, when the spirally shaped passage 25 is formed, an operating noise transfer direction inside the first housing 20 is changed at the first outlet hole 24 once and continuously changed afterward.

Further, an inner space of the first housing 20 may be formed to change a cross sectional area of a transfer path of the operating noise by sequentially changing cross sectional areas of a first pipe 40, the at least one inlet hole 23 (refer to FIG. 3), a fixing hole 21, a first outlet hole 24, a spirally shaped passage 25, at least one second outlet hole 33, and a second pipe 50 when transferring the operating noise from an upper portion of the chamber 10 downwards.

Accordingly, operating noise can be diminished by changing a cross sectional area of the operating noise transfer path and the operating noise transfer direction.

Figure 3:
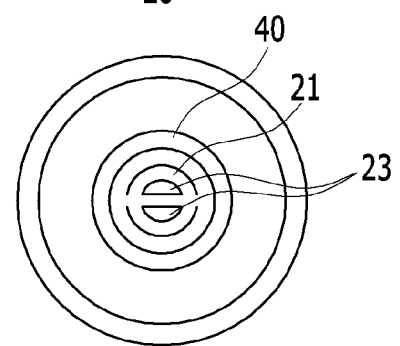
FIG. 3 is a top plan view of a first housing of a chamber according to the present disclosure.
Figure 4:
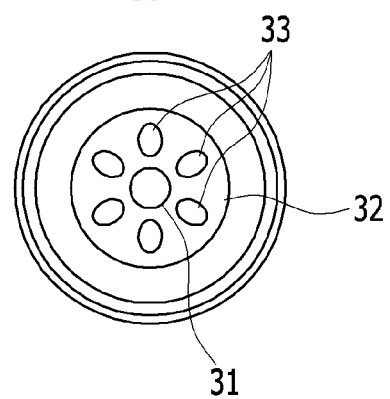
FIG. 4 is a top plan view of a second housing of a chamber according to the present disclosure.

FIG. 3 is a top plan view of a first housing of a chamber according to the present disclosure. FIG. 4 is a top plan view of a second housing of a chamber according to the present disclosure.

FIG. 3 shows a top plan view of a first housing 20 when seeing from an upper portion of the first pipe 40, and FIG. 4 shows a top plan view of a second housing 30 when seeing from an upper portion of the second housing 30 after the first housing 20 is separated.

The at least one inlet hole 23 is formed by two holes at an upper end of the column 21.

Accordingly, the operating noise of the PCSV 1, which enters the first pipe 40, is transferred to the fixing hole 22 through the two inlet holes 23.

Then, the operating noise is diminished in processes of the operating noise transfer direction being changed when the operating noise passes through the first outlet hole 24 and the operating noise being transferred into the second pipe 50 by passing through the spirally shaped passage 25 and the at least one second outlet hole 33 formed at the outlet hole portion 32 illustrated in FIG. 4.

An upper end portion of the first housing 20 may be fitted at or integrally formed with an end of the first pipe 40 such that the at least one inlet hole 23 communicates with the first pipe 40, and a lower end portion of the second housing 30 may be fitted at or integrally formed with an end of the second pipe 50 such that the at least one second outlet hole 33 communicates with the second pipe 50.

The first pipe 40 and the second pipe 50 may be portions of the vapor hose 5 to connect the canister and the PCSV 1, or may be respectively connected to one end of the vapor hose 5 and another end of which are respectively connected to an upper end of the first housing 20 and a lower end of the second housing 30.

Vehicle noise is reduced during engine idling and driving at low speed because operating noise transferred from the PCSV to a driver's seat and pulsation noise of fuel evaporation gas are reduced, according to the present disclosure as explained in detail.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A chamber for reducing operating noise of a purge control solenoid valve (PCSV) for an evaporative emission control system, the chamber comprising:
   a first housing into which the operating noise of the PCSV enters, the first housing having an inner space such that a cross sectional area of an operating noise transfer path or an operating noise transfer direction is changed at least once; and
   a second housing having an upper portion coupled to a lower portion of the first housing to transfer the operating noise to the outside,
   wherein at least one end of the chamber in a length direction thereof is connected with a vapor hose which connects a canister collecting fuel evaporation gas generated from a fuel tank with the PCSV to deliver the fuel evaporation gas to an engine and through which the fuel evaporation gas flows,
   wherein the first housing comprises:
   a column extending from an upper portion of a center of the first housing in a lower direction;
   a fixing hole formed from a lower end of the column in an upper direction; and
   at least one inlet hole formed at an upper end of the column and communicating with the fixing hole such that the operating noise enters therethrough into the fixing hole,
   wherein the column has a first outlet hole formed thereat.

2. The chamber of claim 1, wherein the operating noise transfer direction is opposite to a flow direction of the fuel evaporation gas.

3. The chamber of claim 1, wherein a spirally shaped passage is formed around the column in the first housing such that the operating noise transferred to the outside from the first outlet hole is transferred to the upper portion of the second housing.

4. The chamber of claim 1, wherein the second housing comprises:
   an insert portion inserted into the fixing hole to couple the second housing to the first housing; and
   an outlet hole portion formed in a height direction of the second housing and having at least one second outlet hole.

5. The chamber of claim 4, further comprising a first pipe and a second pipe,
   wherein an upper end portion of the first housing is fitted at or integrally formed with an end of the first pipe such that the at least one inlet hole communicates with the first pipe, and a lower end portion of the second housing is fitted at or integrally formed with an end of the second pipe such that the at least one second outlet hole communicates with the second pipe.

* * * * *